United States Patent
Nemoto et al.

[11] Patent Number: 6,102,465
[45] Date of Patent: Aug. 15, 2000

[54] NOISE INSULATING STRUCTURE FOR AUTOMOTIVE VEHICLE PASSENGER COMPARTMENT

[75] Inventors: Kouichi Nemoto; Kyoichi Watanabe; Satoshi Nagashima, all of Kanagawa, Japan

[73] Assignee: Nissan Motor Co., Ltd., Yokohama, Japan

[21] Appl. No.: 09/172,773

[22] Filed: Oct. 15, 1998

[30] Foreign Application Priority Data

Oct. 16, 1997 [JP] Japan .................................... 9-284059

[51] Int. Cl.⁷ .................................................. B62D 33/00
[52] U.S. Cl. ........................................... 296/39.3; 181/286
[58] Field of Search ................. 296/39.1, 39.3; 181/286, 288

[56] References Cited

U.S. PATENT DOCUMENTS

| | | | |
|---|---|---|---|
| 3,918,541 | 11/1975 | Krieger | 180/69 |
| 3,953,632 | 4/1976 | Robinson | 296/39.3 X |
| 4,539,252 | 9/1985 | Franz | 428/218 |
| 4,619,344 | 10/1986 | Uesugi et al. | 181/229 |
| 4,705,139 | 11/1987 | Gahlau et al. | 181/290 |
| 5,554,831 | 9/1996 | Matsukawa et al. | 181/286 X |
| 5,817,408 | 10/1998 | Orimo et al. | 296/39.3 X |

FOREIGN PATENT DOCUMENTS

| | | |
|---|---|---|
| 0 208 268 | 1/1987 | European Pat. Off. . |
| 11-15475 | 1/1999 | Japan . |
| 2-53948 | 2/1999 | Japan . |
| 0 056 360 | 3/1981 | United Kingdom . |
| 2 163 388 | 2/1986 | United Kingdom . |
| 2322862 | 9/1998 | United Kingdom . |

OTHER PUBLICATIONS

"Automotive Vehicle Engineering Handbook", Design section, pp. 316–323, 1992.

*Primary Examiner*—Joseph D. Pape
*Assistant Examiner*—Jason Morrow
*Attorney, Agent, or Firm*—Foley & Lardner

[57] ABSTRACT

A noise insulating structure for a passenger compartment of an automotive vehicle. The noise insulating structure comprises first, second and third sound absorbing materials which are disposed respectively to a head lining, a dash insulator and a floor carpet disposed in the passenger compartment. The first sound absorbing material is capable of absorbing sound within a first frequency range of from 0.8 to 10 KHz. The second sound absorbing material is capable of absorbing sound within a second frequency range of from 0.3 to 2 KHz. The third sound absorbing material is capable of absorbing sound within a third frequency range of from 0.1 to 1 KHz. Each sound absorbing material is formed of a unshaped polyester fiber mixture which is prepared by mixing polyester (main) fibers and binder fibers for bonding the polyester fibers to each other.

12 Claims, 3 Drawing Sheets

NOISE INSULATING STRUCTURE FOR AUTOMOTIVE VEHICLE PASSENGER COMPARTMENT

BACKGROUND OF THE INVENTION

1. Field of the Invention

This invention relates to a noise insulating structure for improving silence characteristics within a passenger compartment of an automotive vehicle.

2. Description of the Prior Art

Figure 3A:
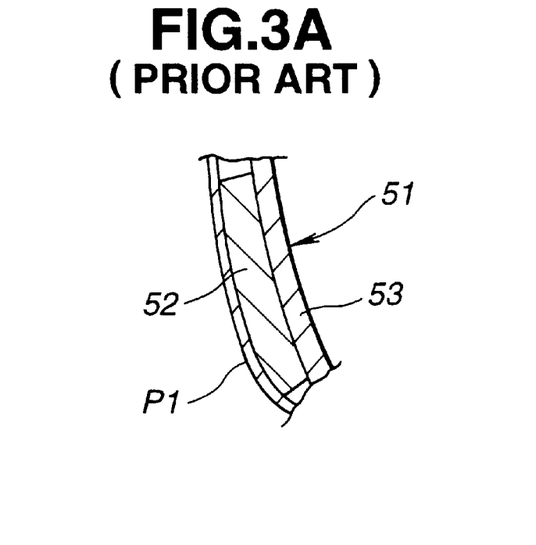
FIG. 3A is a fragmentary sectional view of a conventional dash insulator of an automotive vehicle.
Figure 3B:
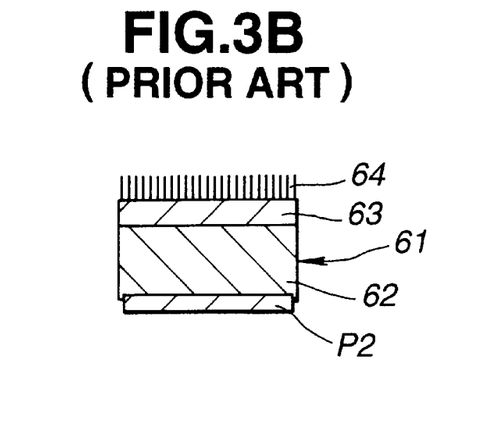
FIG. 3B is a fragmentary sectional view of a conventional floor carpet of the automotive vehicle.
Figure 3C:
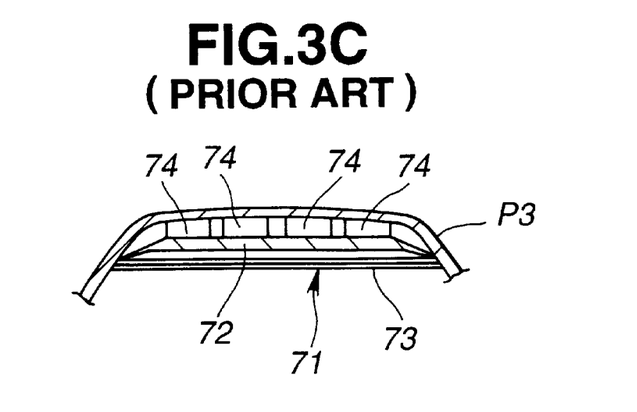
FIG. 3C is a fragmentary sectional view of a conventional head lining of the automotive vehicle.

In a modern automotive vehicle, a plurality of interior parts are installed in a passenger compartment to maintain comfortableness for vehicle passengers. Of these interior parts, particularly a dash insulator, a floor carpet and a head lining are in close relation to silence characteristics within the passenger compartment, forming part of an interior structure of the passenger compartment. A typical conventional interior structure will be illustrated in FIGS. 3A to 3C. As shown in FIG. 3A, a conventional dash insulator 51 is constructed by successively laminating a low density layer 52 and a high density layer 53 on a dash panel p1 which serves as a partition wall disposed between an engine compartment and the passenger compartment. The low density layer 52 is usually formed of felt, polyurethane foam or nonwoven fabric. The high density layer 53 is usually formed of polyvinyl chloride sheet or rubber sheet in which filler is mixed. As shown in FIG. 3B, a conventional floor carpet 61 is constructed by successively laminating a low density layer 62, a high density layer 63 and a carpet skin layer 64 on a floor panel p2. The low density layer 62 is usually formed of a porous material such as felt, polyurethane foam or nonwoven fabric. The high density layer 63 is formed of a material which has no air-permeability, such as EVA sheet or polyethylene sheet in which filler is mixed. Additionally, as shown in FIG. 3C, a conventional head lining 71 is constructed by bonding a skin layer 73 on a base material 72 covering a roof panel p3. The base material 72 is usually formed of corrugated cardboard or plastic. A felt 74 is disposed between the base material 72 and the roof panel p3.

With the above conventional interior structure, the dash insulator 51 may somewhat reduce noise entering the passenger compartment from the engine compartment. The floor carpet 61 may somewhat reduce noise entering the passenger compartment from the engine compartment and the outside of the vehicle. The head lining may somewhat reduce noise entering the passenger compartment from the outside of the vehicle.

A noise insulating technique using above conventional interior structure is disclosed in "Automotive Vehicle Engineering Handbook", Design section, Pages 316–323, compiled by a corporation of Automotive Vehicle Engineering Society and published (the First Edition, on Mar. 1, 1991.

BRIEF SUMMARY OF THE INVENTION

As discussed above, silence characteristics for the passenger compartment has been able to be obtained to some extent with the conventional interior structure including the dash insulator 51, the floor carpet 61 and the head lining 71. However, in order to obtain higher silence characteristics for the passenger compartment, it is required to increase an amount of a sound-absorbable material in each of the dash insulator 51, the floor carpet 61 and the head lining 51. For example, in case of the dash insulator 51 and the floor carpet 61, the amount of the high density layers 53, 63 are required to increase. However, by thus merely increasing the amount of the sound-absorbable materials, weight of the interior parts is increased, which is very disadvantageous. Additionally, it has been usual that no noise insulating function is provided in other interior parts such as a front seat, a rear seat, a head rest, a door inner trim, a rear parcel trim, pillars, an instrument panel, a cluster and a center console.

It is an object of the present invention to provide an improved noise insulating structure for a passenger compartment of an automotive vehicle, which can effectively overcome drawbacks encountered in conventional noise insulating structure in a passenger compartment of an automotive vehicle.

Another object of the present invention is to provide an improved noise insulating structure for a passenger compartment of an automotive vehicle, which can achieve a further improvement in silence characteristics within the passenger compartment while suppressing an increase in weight of interior parts at the minimum level.

A further object of the present invention is to provide an improved noise insulating structure for a passenger compartment of an automotive vehicle, by which noise within the passenger compartment can be effectively reduced totally under cooperation of a plurality of sound insulating materials which are respectively provided to a plurality of interior parts of the vehicle.

An aspect of the present invention resides in a noise insulating structure for a passenger compartment of an automotive vehicle. The noise insulating structure comprises a plurality of interior parts disposed in the passenger compartment. Additionally, a plurality of sound absorbing materials are provided to be disposed respectively to the plurality of interior parts. The plurality of sound absorbing materials are different in frequency range where sound is absorbed.

Another aspect of the present invention resides in a noise insulating structure for a passenger compartment of an automotive vehicle. The noise insulating structure comprises a plurality of interior parts disposed in the passenger compartment, including a head lining, a dash insulator, and a floor carpet. Additionally, a plurality of sound absorbing materials are provided including first, second and third sound absorbing materials which are disposed respectively to the head lining, the dash insulator and the floor carpet. The first sound absorbing material is capable of absorbing sound within a first frequency range. The second sound absorbing material is capable of absorbing sound within a second frequency range. The third sound absorbing material is capable of absorbing sound within a third frequency range. The first, second and third frequency ranges are different from each other. Each sound absorbing material is formed of a fiber body whose major part is polyester fibers. It is preferable that the first frequency range is 0.8 to 10 KHz; the second frequency range is from 0.3 to 2 KHz; and the third frequency range is from 0.1 to 1 KHz.

With the above aspects of the present invention, the plural sound absorbing materials provided respectively to the plural interior parts can effectively absorb sounds or noises within allotted frequency ranges thereby to totally reduce noise within the passenger compartment to a large extent. This can sharply improve silence characteristics within the passenger compartment while suppressing an weight increase for the interior parts at the minimum level.

BRIEF DESCRIPTION OF THE INVENTION

DETAILED DESCRIPTION OF THE INVENTION

Figure 1:
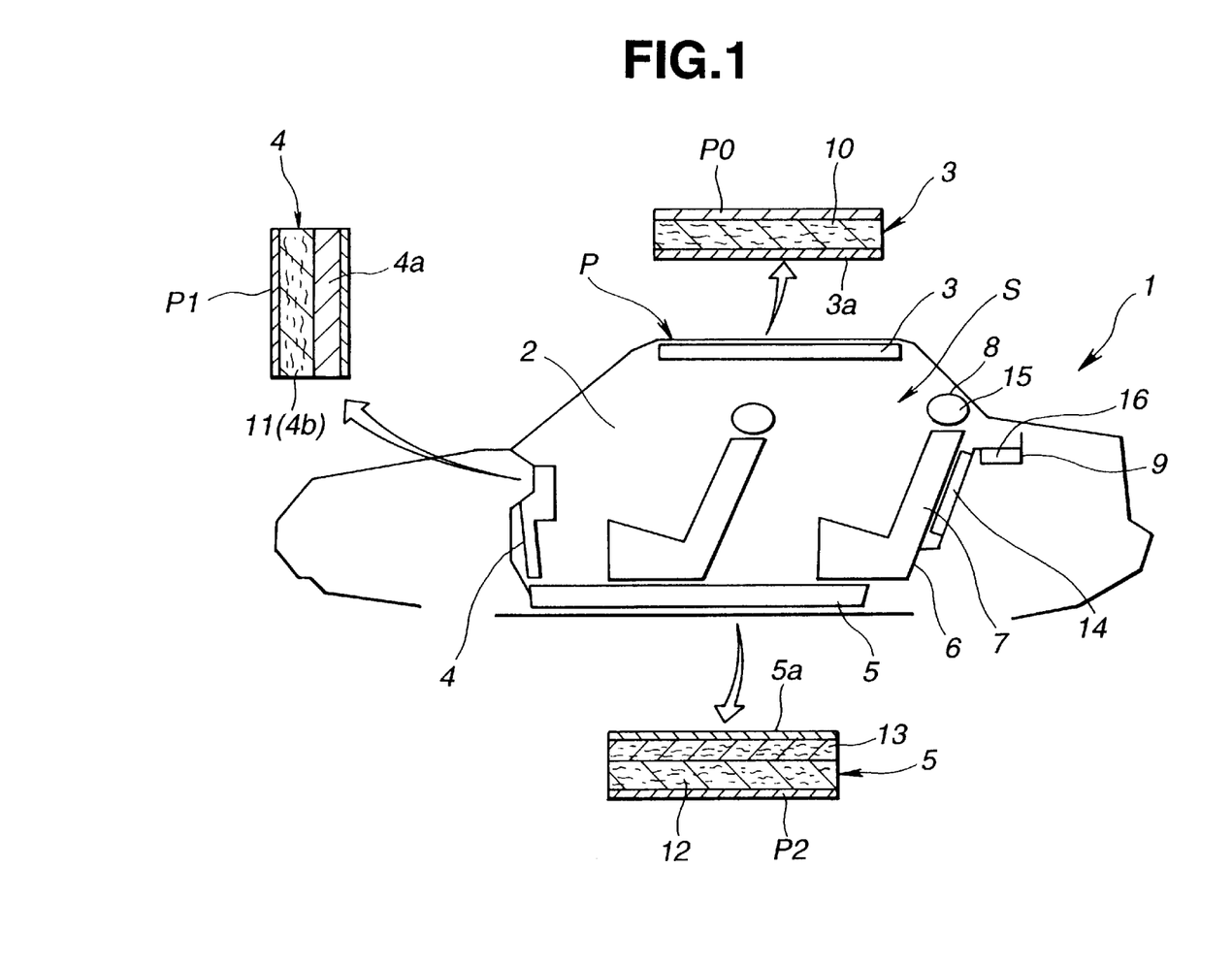
FIG. 1 is an explanatory schematic illustration showing an embodiment of a noise insulating structure for an automotive vehicle passenger compartment, according to the present invention.

Referring now to FIG. 1, an embodiment of a noise insulating structure for a passenger compartment 2 of an automotive vehicle 1 is illustrated by the reference character S. A plurality of interior parts are disposed in the passenger compartment 2 and include a head lining 3, a dash insulator 4 and a floor carpet 5. The interior parts further include a front seat (not identified), a rear seat 6, a head rest 8 for the seat, a door inner trim (not shown), a rear parcel panel 9, pillars (not shown), an instrument panel (not identified), a cluster (not shown), and a center console (not shown).

The head lining 3, the dash insulator 4 and the floor carpet 5 are respectively provided with sound absorbing materials 10, 11, 12 and form part of a noise insulating structure S in an interior structure (not identified) of the passenger compartment. The sound absorbing materials 10, 11, 12 are different in frequency range of noise or sound to be absorbed. Specifically, the sound absorbing material 10 is capable of absorbing noise or sound within a range of from 0.8 to 10 KHz. The sound absorbing material 11 is capable of absorbing noise or sound within a range of from 0.3 to 2 KHz. The sound absorbing material 12 is capable of absorbing noise or sound within a range of from 0.1 to 1 KHz.

The sound absorbing material or base material 10 is disposed in contact with a roof panel P0 forming part of a vehicle body P and located between the roof panel P0 and a skin layer 3a of the head lining 3, in which the sound absorbing material 10 constitutes part of the head lining 3. The sound absorbing material 10 is formed of an unshaped polyester fiber mixture or body which is prepared by mixing polyester fibers (main fibers) having a predetermined diameter and polyester binder fibers having a predetermined diameter and serving as binder for the polyester fibers. The sound absorbing material 10 has a predetermined surface density and is formed to occupy a predetermined part in volume of the space between the roof panel P0 and the skin layer 3a.

Each of the polyester binder fibers is, for example, configured such that a core-like usual polyester fiber is surrounded with a clad-like component which has a melting point lower than that (about 260° C.) of polyester. The clad-like component serves to bond fibers to each other.

The sound absorbing material 11 is disposed in contact with a dash panel P1 forming part of the vehicle body P and located between the dash panel P1 and a high density layer 4a which has no air-permeability and is positioned on the side of the passenger compartment 2 relative to the sound absorbing material 11. The sound absorbing material 11 serves as a low density layer 4b and is formed of an unshaped polyester fiber mixture or body which is prepared by mixing polyester fibers (main fibers) having a predetermined diameter and polyester binder fibers having a predetermined diameter and serving as binder for the polyester fibers. The sound absorbing material 11 is formed to have a predetermined surface density and to occupy a predetermined part in volume of the space between the high density layer 4a and the dash panel P1. Additionally, the sound absorbing material 11 is formed to occupy a predetermined part in area of the whole surface of the dash panel P1.

The sound absorbing material or floor insulator 12 is disposed in contact with a floor panel P2 forming part of the vehicle body P, and located between the floor panel P2 and another sound absorbing material 13 of the floor carpet 5. The sound absorbing material 13 is formed in place of a backing layer. The sound absorbing material 12 is formed of an unshaped polyester fiber mixture or body which is formed by mixing polyester fibers (main fibers) having a predetermined diameter and polyester binder fibers serving as binder for the polyester fibers. The sound absorbing material 12 is formed to have a predetermined surface density and to occupy a predetermined part in volume of the space between the floor panel P2 and the sound absorbing material 13 of the floor carpet 5. In this case, the sound absorbing material 13 is a single fiber body which is formed of fibers having a predetermined diameter, and is formed to have a predetermined surface density. The sound absorbing material 13 may be formed of a fiber mixture which is prepared by mixing fibers having a predetermined diameter and binder fibers having a predetermined diameter and serving as binder for the fibers, the material being formed to have a predetermined surface density.

With the above noise insulating structure for the automotive vehicle passenger compartment 2, noise in a high frequency range can be effectively absorbed by the head lining 3; noise in medium and high frequency range can be effectively absorbed by the dash insulator 4; and noise in a low frequency range can be effectively absorbed by the floor carpet 5. The total interior parts 2, 3, 5 can sharply lower the noise level within the passenger compartment, so that the passenger compartment 2 can be largely improved in silence characteristics while suppressing an weight increase for the interior parts at the minimum level.

Besides, the sound absorbing materials 10, 11, 12, 13 are configured to be suitable in fiber diameter, fiber cross-sectional shape, fiber arrangement and blending ratio of the binder fibers to the main fibers, in accordance with the installed position of the absorbing materials. Accordingly, the sound absorbing materials can obtain desired sound absorbing characteristics such as a low spring characteristics required for suppressing transmission of vibration from the panels of the vehicle body P to the upper part of the passenger compartment 2, and a high sound absorbing characteristics required for reducing noise transmitted by airborne from the vehicle body panels to the passenger compartment 2. In case of the dash insulator 4, the sound absorbing material 11 is disposed between the high density layer 4a and the dash panel P1 thereby constituting a double-wall noise insulating structural member having both the low spring characteristics and the high sound absorption characteristics, in which vibration can be prevented from transmission from the dash panel to the upper part of the inside of the passenger compartment under the effect of the low spring characteristics, while noise can be prevented from transmission from the dash panel to the inside of the passenger compartment by airborne under the effect of the high sound absorption characteristics.

Additionally, a sound absorbing material 14 is disposed in close proximity to the seat back 7 of a rear seat 6 of the plural interior parts inside the passenger compartment 2 in such a manner to occupy a predetermined part in area of the surface area of the seat back 7. The sound absorbing material 14 is formed of an unshaped polyester fiber mixture which is prepared by mixing polyester fibers (main fibers) having a predetermined diameter and polyester binder fibers having a predetermined diameter and serving as binder for polyester fibers. The sound absorbing material 14 is formed to have a predetermined surface density and functions to further improve silence characteristics particularly around the rear seat 6 in the passenger compartment 2.

A sound absorbing material 15 is provided to a head rest 8 (for the seat 7) and is formed of a thermally-shaped polyester fiber mixture which is prepared by mixing polyester fibers (main fibers) having a predetermined diameter and polyester binder fibers having a predetermined diameter and serving as binder for the polyester fibers. The sound absorbing material 15 is formed to have a predetermined surface density and functions to remarkably improve silence characteristics at a position close to the ears of a vehicle occupant.

Further, a sound absorbing material 16 is provided to a rear parcel panel 9 of the plural interior parts inside the passenger compartment 2. The sound absorbing material 16 is formed of a thermally-shaped polyester fiber mixture which is prepared by mixing polyester fibers having a predetermined diameter and polyester binder fibers having a predetermined diameter and serving as binder for polyester fibers. The sound absorbing material 15 is formed to have a predetermined surface density and functions to further improve silence characteristics particularly around the rear seat 6 in the passenger compartment 2.

It is preferable that the sound insulating material formed of the thermally-shaped polyester fiber body or mixture is used for an outer section and for a section on passenger compartment side, of each interior part, while the sound insulating material formed of the unshaped polyester fiber body or mixture is used for an inner section and for a section on the opposite side relative to the passenger compartment, of each interior part.

The present invention will be more readily understood with reference to the following Examples in comparison with Comparative Examples; however, these examples are intended to illustrate the invention and are not to be construed to limit the scope of the invention.

EXAMPLE 1

As shown in FIG. 1, sound absorbing materials 10, 11, 12 were respectively used for a head lining 3, a dash insulator 4 and a floor carpet 5 of a plurality of interior parts disposed in a passenger compartment 2 of an automotive vehicle. The head lining 3, the dash insulator 4 and the floor carpet 5 formed part of a noise insulating structure S for the passenger compartment 2. The noise insulating structure S formed part of an interior structure (not identified) of the passenger compartment 2. The sound absorbing materials 10, 11, 12 were different in frequency range of noise or sound to be absorbed. Specifically, the sound absorbing material 10 was capable of absorbing noise or sound within a range of from 0.8 to 10 KHz. The sound absorbing material 11 was capable of absorbing noise or sound within a range of from 0.3 to 2 KHz. The sound absorbing material 12 was capable of absorbing noise or sound within a range of from 0.1 to 1 KHz.

The sound absorbing material 10 was disposed in contact with a roof panel P0 of a vehicle body P and located between the roof panel P0 and a skin layer 3a of the head lining 3, in which the sound absorbing material 10 constituted part of the head lining 3. The sound absorbing material 10 was formed of an unshaped polyester fiber mixture which was prepared by mixing polyester fibers (main fibers) having a diameter of about 20 $\mu$m and polyester binder fibers having a diameter of about 20 $\mu$m and serving as binder for the polyester fibers. The sound absorbing material had a surface density of 1.0 kg/m$^2$ and was formed to occupy 100% by volume of the space between the roof panel P0 and the skin layer 3a.

The sound absorbing material 11 was disposed in contact with a dash panel P1 of the vehicle body P and located between the dash panel P1 and a high density layer 4a which had no air-permeability and was positioned on the side of the passenger compartment 2 relative to the sound absorbing material 11. The sound absorbing material 11 served as a low density layer 4b and was formed of an unshaped polyester fiber mixture which was prepared by mixing polyester fibers (main fibers) having a diameter of about 10 $\mu$m and polyester binder fibers having a diameter of about 10 $\mu$m and serving as binder for the polyester fibers. The sound absorbing material 11 was formed to have a surface density of 1.2 kg/m$^2$ and to occupy 100% by volume of the space between the high density layer 4a and the dash panel P1. Additionally, the sound absorbing material 11 was formed to occupy 100% in area of the whole surface of the dash panel P1.

The sound absorbing material 12 was disposed in contact with a floor panel P2 and located between the floor panel P2 and another sound absorbing material 13 of the floor carpet 5. The sound absorbing material 13 was formed in place of a backing layer. The sound absorbing material 12 was formed of an unshaped polyester fiber mixture which was formed by mixing polyester fibers (main fibers) having a diameter of about 20 $\mu$m and polyester binder fibers having a diameter of about 20 $\mu$m and serving as binder for the polyester fibers. The sound absorbing material 12 was formed to have a surface density of 0.8 kg/m² and to occupy 100% by volume of the space between the floor panel P2 and the sound absorbing material 13 of the floor carpet 5. In this case, the sound absorbing material 13 was a single fiber body which was formed of fibers having a diameter of about 10 μm, and was formed to have a surface density of 1.0 kg/m². The sound absorbing material 13 might be formed of a fiber mixture which was prepared by mixing fibers having a diameter of about 10 μm and binder fibers having a diameter of about 10 μm serving as binder for the fibers, the material being formed to have a surface density of 1.0 kg/m².

Figure 2:
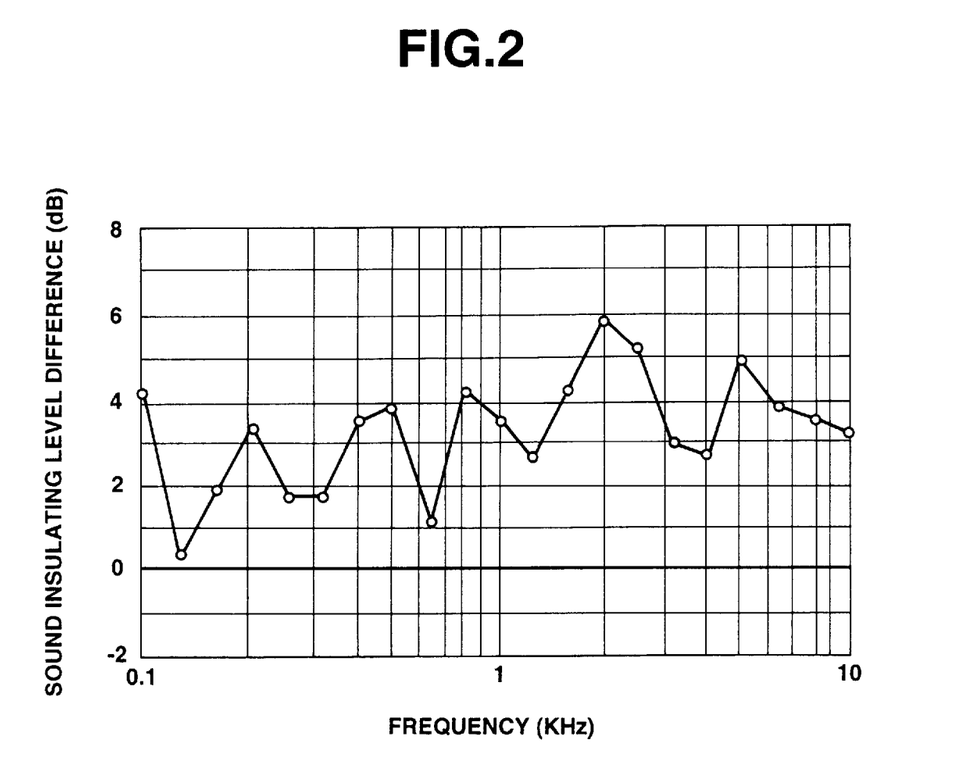
FIG. 2 is a graph showing a noise insulating performance of the noise insulating structure of FIG. 1.

Accordingly, with the above noise insulating structure for the automotive vehicle passenger compartment 2, noise in a high frequency range could be effectively absorbed by the head lining 3; noise in medium and high frequency range could be effectively absorbed by the dash insulator 4; and noise in a low frequency range could be effectively absorbed by the floor carpet 5. The total interior parts 2, 3, 5 could lower a noise level of not less than 2 dB within a frequency range of from 0.1 to 10 KHz relative to a conventional interior structure within a frequency range of from 0.1 to 10 KHz, as shown in FIG. 2. FIG. 2 depicted the sound insulating level difference (difference in sound insulating or absorbing level) dB of the interior or noise insulating structure of this example shown in FIG. 1 from the conventional interior structure, in terms of frequency KHz of noise within the passenger compartment 2. The conventional interior structure was similar to the interior structure shown in FIG. 1 with the exception that the head lining 3, the dash insulator 4 and the floor carpet 5 were respectively not provided with the sound absorbing materials 10, 11, 12. As a result, the passenger compartment 2 could be largely improved in silence characteristics while suppressing an weight increase for the interior parts at the minimum level.

Besides, in the noise insulating structure of this example, the sound absorbing materials 10, 11, 12, 13 were formed mainly of polyester fibers, and therefore lowering in cost required for noise insulation could be effectively achieved in addition to advantage that these sound absorbing materials were high in durability.

EXAMPLE 2

The noise insulating structure of this example was the same as that in EXAMPLE 1 with the exception that the sound absorbing material 10 disposed for the head lining 3 was formed to have a surface density of 1.2 kg/m². In this example, silence characteristics was remarkable at the position of close to the ears of a vehicle occupant.

EXAMPLE 3

The noise insulating structure of this example was the same as that in EXAMPLE 1 with the exception that the sound absorbing material 10 disposed for the head lining 3 was formed to have a surface density of 0.8 kg/m². In this example, weight-lightening for the interior parts could be achieved over the noise insulating structure in EXAMPLE 1.

EXAMPLE 4

The noise insulating structure of this example was the same as that in EXAMPLE 1 with the exception that the sound absorbing material 10 for the head lining 3 was formed to occupy 80% by volume of the space between the roof panel P0 and the skin layer 3a. In this example, weight-lightening for the interior parts could be achieved similarly to EXAMPLE 3.

EXAMPLE 5

The noise insulating structure of this example was the same as that in EXAMPLE 1 with the exception that the sound absorbing material 10 for the head lining 3 was formed to have a surface density of 1.2 kg/m², and to occupy 80% by volume of the space between the roof panel P0 and the skin layer 3a. In this example, silence characteristics was remarkable at the position close to the ears of a vehicle occupant similarly to Example 2.

EXAMPLE 6

The noise insulating structure of this example was the same as that in Example 1 with the exception that the sound absorbing material 10 for the head lining 3 was formed to have a surface density of 0.8 kg/m², and to occupy 80% by volume of the space between the roof panel P0 and the skin layer 3a. In this example, weight-lightening for the interior parts could be achieved.

EXAMPLE 7

The noise insulating structure of this example was the same as that in Example 1 with the exception that the sound absorbing material 10 for the head lining 3 was formed to have a surface density of 1.2 kg/m²; and the fibers of the polyester fiber mixture constituting this sound absorbing material 10 had a diameter ranging from 10 to 15 μm. In this example, weight increase for the interior parts could be suppressed at the minimum level similarly to Example 1 while further improving silence characteristics within the passenger compartment 2.

EXAMPLE 8

The noise insulating structure of this example was the same as that in Example 1 with the exception that the sound absorbing material 10 for the head lining 3 was formed to have a surface density of 0.8 kg/m²; and the main polyester fibers of the polyester fiber mixture constituting this sound absorbing material 10 had a diameter ranging from 10 to 15 μm. In this example, further weight-lightening for the interior parts could be achieved over Example 7.

EXAMPLE 9

The noise insulating structure of this example was the same as that in Example 1 with the exception that the sound absorbing material 11 for the dash insulator 4 was formed to occupy 100% by volume of the space between the dash panel P1 and a high density layer 4a which had no air-permeability and was positioned on the side of the passenger compartment 2 relative to the sound absorbing material 11; and the sound absorbing material 11 was formed to occupy 50% in area of the whole surface of the dash panel P1. In this example, weight increase for the interior parts could be suppressed at the minimum level similarly to Example 1 while further improving silence characteristics within the passenger compartment 2.

EXAMPLE 10

The noise insulating structure of this example was the same as that in Example 1 with the exception that the sound absorbing material 11 for the dash insulator 4 was formed to occupy 100% by volume of the space between the dash panel P1 and a high density layer 4a which had no air-permeability and was positioned on the side of the passenger compartment 2 relative to the sound absorbing material 1; the sound absorbing material 11 was formed to occupy 50% in area of the whole surface of the dash panel P1; and the sound absorbing material 11 was formed to have a surface density of 1.0 kg/m$^2$. In this example, weight increase for the interior parts could be suppressed at the minimum level similarly to Example 1 while further improving silence characteristics within the passenger compartment 2.

EXAMPLE 11

The noise insulating structure of this example was the same as that in Example 1 with the exception that the sound absorbing material 11 for the dash insulator 4 was formed to occupy 100% by volume of the space between the dash panel P1 and a high density layer 4a which had no air-permeability and was positioned on the side of the passenger compartment 2 relative to the sound absorbing material 11; the sound absorbing material 11 was formed to occupy 50% in area of the whole surface of the dash panel P1; and the sound absorbing material 11 was formed to have a surface density of 0.8 kg/m$^2$. In this example, weight increase for the interior parts could be suppressed at the minimum level similarly to Example 1 while further improving silence characteristics within the passenger compartment 2.

EXAMPLE 12

The noise insulating structure of this example was the same as that in Example 1 with the exception that the sound absorbing material 11 for the dash insulator 4 was formed to occupy 50% by volume of the space between the dash panel P1 and a high density layer 4a which had no air-permeability and was positioned on the side of the passenger compartment 2 relative to the sound absorbing material 11. In this example, weight-lightening for the interior parts could be achieved.

EXAMPLE 13

The noise insulating structure of this example was the same as that in Example 1 with the exception that the sound absorbing material 11 for the dash insulator 4 was formed to occupy 50% by volume of the space between the dash panel P1 and a high density layer 4a which had no air-permeability and was positioned on the side of the passenger compartment 2 relative to the sound absorbing material 11; and the sound absorbing material 11 was formed to have a surface density of 1.0 kg/m$^2$. In this example, further weight-lightening for the interior parts could be achieved.

EXAMPLE 14

The noise insulating structure of this example was the same as that in Example 1 with the exception that the sound absorbing material 11 for the dash insulator 4 was formed to occupy 50% by volume of the space between the dash panel P1 and a high density layer 4a which had no air-permeability and was positioned on the side of the passenger compartment 2 relative to the sound absorbing material 11; and the sound absorbing material 11 was formed to have a surface density of 0.8 kg/m$^2$. In this example, sharp weight-lightening for the interior parts could be achieved.

EXAMPLE 15

The noise insulating structure of this example was the same as that in Example 1 with the exception that the sound absorbing material 11 for the dash insulator 4 was formed to occupy 100% by volume of the space between the dash panel P1 and a high density layer 4a which had no air-permeability and was positioned on the side of the passenger compartment 2 relative to the sound absorbing material 11; the sound absorbing material 11 was formed to occupy 100% in area of the whole surface of the dash panel P1; the sound absorbing material 11 was formed to have a surface density of 1.2 kg/m$^2$; and the fibers of the unshaped polyester fiber mixture constituting the sound absorbing material 11 had a diameter ranging from 20 to 30 $\mu$m. In this example, weight increase for the interior parts could be suppressed at the minimum level similarly to Example 1 while further improving silence characteristics within the passenger compartment 2.

EXAMPLE 16

The noise insulating structure of this example was the same as that in Example 15 with the exception that the sound absorbing material 11 for the dash insulator 4 was formed to have a surface density of 1.0 kg/m$^2$. In this embodiment, weight increase for the interior parts could be suppressed at the minimum level while further improving silence characteristics within the passenger compartment 2 similarly to Example 15.

EXAMPLE 17

The noise insulating structure of this example was the same as that in Example 15 with the exception that the sound absorbing material 11 for the dash insulator 4 was formed to have a surface density of 0.8 kg/m$^2$. In this embodiment, weight increase for the interior parts could be suppressed at the minimum level while further improving silence characteristics within the passenger compartment 2 similarly to Example 15. Additionally, weight-lightening for the interior parts could be achieved.

EXAMPLE 18

The noise insulating structure of this example was the same as that in Example 1 with the exception that the sound absorbing material 10 for the head lining 3 was formed to occupy 80% by volume of the space between the roof panel P0 and the skin layer 3a; and the sound absorbing material 12 for the floor carpet 5 was formed to have a surface density of 1.0 kg/m$^2$. In this example, weight increase for the interior parts could be suppressed at the minimum level similarly to Example 1 while further improving silence characteristics within the passenger compartment 2.

EXAMPLE 19

The noise insulating structure of this example was the same as that in Example 18 with the exception that the sound absorbing material 12 for the floor carpet 5 was formed to have a surface density of 0.6 kg/m². In this example, weight-lightening for the interior parts could be achieved over Example 18.

EXAMPLE 20

The noise insulating structure of this example was the same as that in Example 18 with the exception that the sound absorbing material 12 for the floor carpet 5 was formed to have a surface density of 0.3 kg/m². In this example, sharp weight-lightening for the interior parts could be achieved over Example 18.

EXAMPLE 21

The noise insulating structure of this example was the same as that in Example 18 with the exception that the fibers of the unshaped single fiber body (or the fiber mixture prepared by mixing the main fibers and the binder fibers) constituting the sound absorbing material 13 disposed in place of the backing layer of the floor carpet 5 had a diameter ranging from 20 to 30 μm. In this example, weight increase for the interior parts could be suppressed at the minimum level while further improving silence characteristics within the passenger compartment 2 similarly to Example 18.

EXAMPLE 22

The noise insulating structure of this example was the same as that in Example 21 with the exception that the sound absorbing material 13 disposed in place of the backing layer of the floor carpet 5 was formed to have a surface density of 0.6 kg/m². In this example, weight-lightening for the interior parts could be achieved over Example 21.

EXAMPLE 23

The noise insulating structure of this example was the same as that in Example 21 with the exception that the sound absorbing material 13 disposed in place of the backing layer of the floor carpet 5 was formed to have a surface density of 0.2 kg/m². In this example, sharp weight-lightening for the interior parts could be achieved over Example 21.

EXAMPLE 24

The noise insulating structure of this example was the same as that in Example 1 with the following exception: As shown in FIG. 1, a sound absorbing material 14 was disposed in close proximity to the seat back 7 of a rear seat 6 of the plural interior parts inside the passenger compartment 2 in such a manner to occupy 50% in area of the surface area of the seat back 7. The sound absorbing material 14 was formed of an unshaped polyester fiber mixture which was prepared by mixing polyester fibers (main fibers) having a diameter of about 10 μm and polyester binder fibers having a diameter of about 10 μm serving as binder for the polyester fibers. Additionally, the sound absorbing material 14 was formed to have a surface density of 1.2 kg/m². In this embodiment, silence characteristics could be further improved particularly around the rear seat 6 in the passenger compartment 2.

EXAMPLE 25

The noise insulating structure of this example was the same as that in Example 24 with the exception that the sound absorbing material 14 disposed to occupy 50% in area of the surface area of the seat back 7 was formed to have a surface density of 0.8 kg/m². In this example, weight-lightening for the interior parts could be achieved over Example 24.

EXAMPLE 26

The noise insulating structure of this example was the same as that in Example 1 with the following exception: As shown in FIG. 1, a sound absorbing material 15 was provided to a head rest 8 (for the seat 7) of the plural interior parts inside the passenger compartment 2. The sound absorbing material 15 was formed of a thermally-shaped polyester fiber mixture which was prepared by mixing polyester fibers (main fibers) having a diameter of about 10 μm and polyester binder fibers having a diameter of about 10 μm and serving as binder for polyester fibers. Additionally, the sound absorbing material 15 was formed to have a surface density of 0.8 kg/m². In this example, silence characteristics was remarkably high at the position close to the ears of a vehicle occupant.

EXAMPLE 27

The noise insulating structure of this example was the same as that in Example 1 with the following exception: As shown in FIG. 1, a sound absorbing material 16 was provided to a rear parcel panel 9 of the plural interior parts inside the passenger compartment 2. The sound absorbing material 16 was formed of a thermally-shaped polyester fiber mixture which was prepared by mixing polyester fibers having a diameter of about 10 μm and polyester binder fibers having a diameter of about 10 μm and serving as binder for the polyester fibers. Additionally, the sound absorbing material 15 was formed to have a surface density of 1.2 kg/m². In this embodiment, silence characteristics could be further improved particularly around the rear seat 6 in the passenger compartment 2.

EXAMPLE 28

The noise insulating structure of this example was the same as that in Example 1 with the exception that the sound absorbing material 16 provided to the rear parcel panel 9 was formed to have a surface density of 0.8 kg/m². In this embodiment, weight-lightening could be achieved over Example 27.

In order to evaluate noise insulating performance of the noise insulating structure of the present invention, noise insulating structures (Comparative Examples) for the comparison purpose were applied for the passenger compartment of the vehicle body P shown in FIG. 1.

COMPARATIVE EXAMPLE 1

The noise insulating structure of this comparative example was the same as that in Example 1 with the following exception:

The sound absorbing materials 10, 11, 12 were respectively disposed for the head lining 3, the dash insulator 4 and the floor carpet 5.

The sound absorbing material 10 for the head lining 3 was formed of an unshaped polyester fiber mixture which was prepared by mixing polyester fibers (main fibers) having a diameter of about 20 μm and polyester binder fibers having a diameter of about 20 μm and serving as binder for the polyester fibers. The sound absorbing material had a surface density of 1.0 kg/m² and was formed to occupy 100% by volume of the space between the roof panel P0 and the skin layer 3a. Additionally, the sound absorbing material 10 was formed to occupy a part or 10% in area of the whole surface of the dash panel P1.

The sound absorbing material 11 for the dash insulator 4 was formed of an unshaped polyester fiber mixture which was prepared by mixing polyester fibers (main fibers) having a diameter of about 10 μm and polyester binder fibers having a diameter of about 10 μm and serving as binder for the polyester fibers. The sound absorbing material 11 was formed to have a surface density of 1.2 kg/m² and to occupy 100% by volume of the space between the high density layer 4a and the dash panel P1. Additionally, the sound absorbing material 11 was formed to occupy a part or 10% in area of the whole surface of the dash panel P1.

The sound absorbing material 12 for the floor carpet 5 was formed of an unshaped polyester fiber mixture which was formed by mixing polyester fibers (main fibers) having a diameter of about 20 μm and polyester binder fibers having a diameter of about 10 μm and serving as binder for the polyester fibers. The sound absorbing material 12 was formed to have a surface density of 0.8 kg/m² and to occupy 100% by volume of the space between the floor panel P2 and the sound absorbing material 13 of the floor carpet 5. Additionally, the sound absorbing material 12 was formed to occupy a part or 10% in area of the whole surface of the dash panel P1.

COMPARATIVE EXAMPLE 2

The noise insulating structure of this comparative example was the same as that in Example 1 with the following exception:

The sound absorbing material 10 for the head lining 3 was formed of an unshaped polyester fiber mixture which was prepared by mixing polyester fibers (main fibers) having a diameter of about 200 μm and polyester binder fibers having a diameter of about 200 μm and serving as binder for the polyester fibers. The sound absorbing material had a surface density of 0.2 kg/m² and was formed to occupy 100% by volume of the space between the roof panel P0 and the skin layer 3a. Additionally, the sound absorbing material 10 was formed to occupy a part or 50% in area of the whole surface of the dash panel P1.

The sound absorbing material 11 for the dash insulator 4 was formed of an unshaped polyester fiber mixture which was prepared by mixing polyester fibers (main fibers) having a diameter of about 200 μm and polyester binder fibers having a diameter of about 200 μm and serving as binder for the polyester fibers. The sound absorbing material 11 was formed to have a surface density of 1.2 kg/m² and to occupy 100% by volume of the space between the high density layer 4a and the dash panel P1. Additionally, the sound absorbing material 11 was formed to occupy a part or 50% in area of the whole surface of the dash panel P1.

The sound absorbing material 12 for the floor carpet 5 was formed of an unshaped polyester fiber mixture which was formed by mixing polyester fibers (main fibers) having a diameter of about 200 μm and polyester binder fibers having a diameter of about 200 μm and serving as binder for the polyester fibers. The sound absorbing material 12 was formed to have a surface density of 0.8 kg/m² and to occupy 100% by volume of the space between the floor panel P2 and the sound absorbing material 13 of the floor carpet 5. Additionally, the sound absorbing material 12 was formed to occupy a part or 50% in area of the whole surface of the dash panel P1.

COMPARATIVE EXAMPLE 3

The noise insulating structure of this comparative example was the same as that in Example 1 with the following exception:

The sound absorbing material 10 for the head lining 3 was formed of an unshaped polyester fiber mixture which was prepared by mixing polyester fibers (main fibers) having a diameter of about 50 μm and polyester binder fibers having a diameter of about 50 μm and serving as binder for the polyester fibers. The sound absorbing material had a surface density of 0.5 kg/m² and was formed to occupy 50% by volume of the space between the roof panel P0 and the skin layer 3a. Additionally, the sound absorbing material 10 was formed to occupy a part or 30% in area of the whole surface of the dash panel P1.

The sound absorbing material 11 for the dash insulator 4 was formed of an unshaped polyester fiber mixture which was prepared by mixing polyester fibers (main fibers) having a diameter of about 30 μm and polyester binder fibers having a diameter of about 30 μm serving as binder for the polyester fibers. The sound absorbing material 11 was formed to have a surface density of 0.5 kg/m² and to occupy 20% by volume of the space between the high density layer 4a and the dash panel P1. Additionally, the sound absorbing material 11 was formed to occupy a part or 50% in area of the whole surface of the dash panel P1.

The sound absorbing material 12 for the floor carpet 5 was formed of an unshaped polyester fiber mixture which was formed by mixing polyester fibers (main fibers) having a diameter of about 100 μm and polyester binder fibers having a diameter of about 100 μm and serving as binder for the polyester fibers. The sound absorbing material 12 was formed to have a surface density of 2.0 kg/m² and to occupy 20% by volume of the space between the floor panel P2 and the sound absorbing material 13 of the floor carpet 5. Additionally, the sound absorbing material 12 was formed to occupy a part or 20% in area of the whole surface of the dash panel P1. In this case, the sound absorbing material 13 was provided in place of the backing layer of the floor carpet 5 and was used in addition to the sound absorbing material 12. The sound absorbing material 13 was a single fiber body which was formed of fibers having a diameter of about 30 μm, and was formed to have a surface density of 0.8 kg/m². The sound absorbing material 13 might be formed of a fiber mixture which was prepared by mixing fibers having a diameter of about 30 μm and binder fibers having a diameter of about 30 μm and serving as binder for the fibers, the material being formed to have a surface density of 0.8 kg/m².

EXPERIMENT

The automotive vehicle body P in which the noise insulating structure of each of Examples and Comparative Examples was incorporated was subjected to an acoustical vibration test in which the vehicle body P was mounted on a vibration testing machine to measure noise level within the passenger compartment upon being vibrated. In this test, noise was generated from a noise from positions which were assumed for tires and the like under a condition where operation of an engine mounted on the vehicle body P was stopped. In accordance with this measured noise level within the passenger compartment, the noise insulating performance of the noise insulating structure was evaluated as shown in Tables 1A, 1B, 2 and 3. Evaluation of noise insulating performance in Tables 1A to 3 is as follows: "A" indicates a very excellent noise insulating performance; "B" indicates an excellent noise insulating performance; "C" indicates a good noise insulating performance; and "C" is an inferior noise insulating performance in which difference in sound insulating level of the example from the above-discussed conventional interior structure was less than 1 dB.

The experimental data in Tables 1A, 1B, 2 and 3 demonstrate that the sound insulating structures (inside the passenger compartment) of Examples 1 to 28 are very excellent as compared with those of Comparative Examples 1 to 3. In other words, it has been confirmed that, according to the present invention, silence characteristics inside the passenger compartment can be further improved while suppressing an increase in weight of interior parts of the automotive vehicle.

TABLE 1A

| | | Example | | 1 | 2 | 3 | 4 | 5 | 6 | 7 | 8 | 9 | 10 | 11 | 12 |
|---|---|---|---|---|---|---|---|---|---|---|---|---|---|---|---|
| Head lining | Sound absorbing material | Installation area | % | 100 | 100 | 100 | 80 | 80 | 80 | 100 | 100 | 100 | 100 | 100 | 100 |
| | | Space occupying rate | % | 100 | 100 | 100 | 100 | 100 | 100 | 100 | 100 | 100 | 100 | 100 | 100 |
| | | Surface density | kg/m$^2$ | 1.0 | 1.2 | 0.8 | 1.0 | 1.2 | 0.8 | 1.2 | 0.8 | 1.0 | 1.0 | 1.0 | 1.0 |
| | | Diameter of main fibers | μm | 20 | 20 | 20 | 20 | 20 | 20 | 10~15 | 10~15 | 20 | 20 | 20 | 20 |
| Dash insulator | Sound absorbing material | Installation area | % | 100 | 100 | 100 | 100 | 100 | 100 | 100 | 100 | 50 | 50 | 50 | 100 |
| | | Space occupying rate | % | 100 | 100 | 100 | 100 | 100 | 100 | 100 | 100 | 100 | 100 | 100 | 50 |
| | | Surface density | kg/m$^2$ | 1.2 | 1.2 | 1.2 | 1.2 | 1.2 | 1.2 | 1.2 | 1.2 | 1.2 | 1.0 | 0.8 | 1.2 |
| | | Diameter of main fibers | μm | 10 | 10 | 10 | 10 | 10 | 10 | 10 | 10 | 10 | 10 | 10 | 10 |
| Floor carpet | Sound absorbing material | Installation area | % | 100 | 100 | 100 | 100 | 100 | 100 | 100 | 100 | 100 | 100 | 100 | 100 |
| | | Space occupying rate | % | 100 | 100 | 100 | 100 | 100 | 100 | 100 | 100 | 100 | 100 | 100 | 100 |
| | | Surface density | kg/m$^2$ | 0.8 | 0.8 | 0.8 | 0.8 | 0.8 | 0.8 | 0.8 | 0.8 | 0.8 | 0.8 | 0.8 | 0.8 |
| | | Diameter of main fibers | μm | 20 | 20 | 20 | 20 | 20 | 20 | 20 | 20 | 20 | 20 | 20 | 20 |
| Floor carpet backing layer | Surface density | | kg/m$^2$ | 1.0 | 1.0 | 1.0 | 1.0 | 1.0 | 1.0 | 1.0 | 1.0 | 1.0 | 1.0 | 1.0 | 1.0 |
| | Diameter of main fibers | | μm | 10 | 10 | 10 | 10 | 10 | 10 | 10 | 10 | 10 | 10 | 10 | 10 |
| | Sound insulating performance | | | A | A | B | B | A | B | A | A | A | B | B | B |

TABLE 1B

| | | Example | | 13 | 14 | 15 | 16 | 17 | 18 | 19 | 20 | 21 | 22 | 23 |
|---|---|---|---|---|---|---|---|---|---|---|---|---|---|---|
| Head lining | Sound absorbing material | Installation area | % | 100 | 100 | 100 | 100 | 100 | 100 | 100 | 100 | 100 | 100 | 100 |
| | | Space occupying rate | % | 100 | 100 | 100 | 100 | 100 | 80 | 80 | 80 | 80 | 80 | 80 |
| | | Surface density | kg/m$^2$ | 1.0 | 1.0 | 1.0 | 1.0 | 1.0 | 1.0 | 1.0 | 1.0 | 1.0 | 1.0 | 1.0 |
| | | Diameter of main fibers | μm | 20 | 20 | 20 | 20 | 20 | 20 | 20 | 20 | 20 | 20 | 20 |
| Dash insulator | Sound absorbing material | Installation area | % | 100 | 100 | 100 | 100 | 100 | 100 | 100 | 100 | 100 | 100 | 100 |
| | | Space occupying rate | % | 50 | 50 | 100 | 100 | 100 | 100 | 100 | 100 | 100 | 100 | 100 |
| | | Surface density | kg/m$^2$ | 1.0 | 0.8 | 1.2 | 1.0 | 0.8 | 1.2 | 1.2 | 1.2 | 1.2 | 1.2 | 1.2 |

TABLE 1B-continued

| | | Example | | 13 | 14 | 15 | 16 | 17 | 18 | 19 | 20 | 21 | 22 | 23 |
|---|---|---|---|---|---|---|---|---|---|---|---|---|---|---|
| | | Diameter of main fibers | μm | 10 | 10 | 20~30 | 20~30 | 20~30 | 10 | 10 | 10 | 10 | 10 | 10 |
| Floor carpet | Sound absorbing material | Installation area | % | 100 | 100 | 100 | 100 | 100 | 100 | 100 | 100 | 100 | 100 | 100 |
| | | Space occupying rate | % | 100 | 100 | 100 | 100 | 100 | 100 | 100 | 100 | 100 | 100 | 100 |
| | | Surface density | kg/m² | 0.8 | 0.8 | 0.8 | 0.8 | 0.8 | 1.0 | 0.6 | 0.3 | 1.0 | 1.0 | 1.0 |
| | | Diameter of main fibers | μm | 20 | 20 | 20 | 20 | 20 | 20 | 20 | 20 | 20 | 20 | 20 |
| Floor carpet backing layer | Surface density | | kg/m² | 1.0 | 1.0 | 1.0 | 1.0 | 1.0 | 1.0 | 1.0 | 1.0 | 1.0 | 0.6 | 0.2 |
| | Diameter of main fibers | | μm | 10 | 10 | 10 | 10 | 10 | 10 | 10 | 10 | 20~30 | 20~30 | 20~30 |
| | | Sound insulating performance | | B | B | A | A | B | A | B | C | A | B | B |

TABLE 2

| | | Example | | 24 | 25 | 26 | 27 | 28 |
|---|---|---|---|---|---|---|---|---|
| Seat back | Sound absorbing material | Surface area | kg/m² | 1.2 | 0.8 | — | — | — |
| | | Diameter of main fibers | μm | 10 | 10 | — | — | — |
| Head rest | Sound absorbing material | Surface area | kg/m² | — | — | 0.8 | — | — |
| | | Diameter of main fibers | μm | — | — | 10 | — | — |
| Rear parcel panel | Sound absorbing material | Surface density | kg/m² | — | — | — | 1.2 | 0.8 |
| | | Diameter of main fibers | μm | — | — | — | 10 | 10 |
| | | | | Installation conditions and fiber configurations of head lining, dash insulator and floor carpet are same as those in Example 1. | | | | |
| | | Noise insulating performance | | A | A | A | A | A |

TABLE 3

| | | Comparative Example | | 1 | 2 | 3 |
|---|---|---|---|---|---|---|
| Head lining | Sound absorbing material | Installation area | % | 10 | 50 | 30 |
| | | Space occupying rate | % | 100 | 100 | 50 |
| | | Surface density | kg/m² | 1.0 | 0.2 | 0.5 |
| | | Diameter of main fibers | μm | 20 | 200 | 50 |
| Dash insulator | Sound absorbing material | Installation area | % | 10 | 50 | 50 |
| | | Space occupying rate | % | 100 | 100 | 20 |
| | | Surface density | kg/m² | 1.2 | 1.2 | 0.5 |
| | | Diameter of main fibers | μm | 10 | 200 | 30 |
| Floor carpet | Sound absorbing material | Installation area | % | 10 | 50 | 20 |
| | | Space occupying rate | % | 100 | 100 | 20 |
| | | Surface density | kg/m² | 0.8 | 0.8 | 2.0 |
| | | Diameter of main fibers | μm | 20 | 200 | 100 |
| Floor carpet backing layer | Surface density | | kg/m² | 1.0 | 1.0 | 0.8 |
| | Diameter of main fibers | | μm | 10 | 10 | 30 |
| | | Noise insulating performance | | D | D | D |

What is claimed is:

1. A noise insulating structure for a passenger compartment of an automotive vehicle, comprising:

a plurality of interior parts disposed in the passenger compartment; and a plurality of sound absorbing materials which are respectively disposed to the plurality of interior parts, the plurality of sound absorbing materials being different in frequency range where sound is absorbed;

wherein said sound absorbing materials is formed of only polyester fibers;

wherein the plurality of interior parts include a head lining, a dash insulator, and a floor carpet;

wherein the plurality of sound absorbing materials include a first sound absorbing material disposed to the head lining, a second sound absorbing material disposed to the dash insulator, and a third sound absorbing material disposed to the floor carpet, said first sound absorbing material effectively absorbing sound within a range of from 0.8 to 10 KHz, said second sound absorbing material effectively absorbing sound within a range of from 0.3 to 2 KHz, said third sound absorbing material effectively absorbing sound within a range of form 0.1 to 1 KHz.

2. A noise insulating structure as claimed in claim 1, wherein the head lining includes a base material and a skin layer; the dash insulator includes a first layer and a second layer, wherein the first layer is higher in density than the second layer; and the floor carpet includes a floor insulator and a backing layer, wherein said first sound absorbing material forms at least a part of said base material of said head lining; said second sound absorbing material forms at least a part of said second layer; and said third sound absorbing material forms at least a part of at least one of said floor insulator and said backing layer.

3. A noise insulating structure as claimed in claim 1, wherein said first sound absorbing material is a mixture of main fibers having a diameter ranging from 10 to 50 μm and binder fibers having a diameter ranging from 10 to 50 μm, and has a surface density ranging from 0.5 to 2.0 kg/m², said first sound absorbing material being formed to occupy a value ranging from 10 to 100% by volume of a space between a roof panel and said skin layer.

4. A noise insulating structure as claimed in claim 1, wherein said second sound absorbing material is formed of a fiber body including at least fibers having a diameter ranging from 10 to 30 μm, and has a surface density ranging from 0.5 to 2.0 kg/m², said second sound absorbing material being formed to occupy a value ranging from 50 to 100% by volume of a space between a first layer and a dash panel and to occupy a value ranging from 50 to 100% in area of a whole surface of said dash panel.

5. A noise insulating structure as claimed in claim 4, wherein said fiber body is a fiber mixture of fibers having a diameter ranging from 10 to 30 μm and binder fibers having a diameter ranging from 10 to 30 μm.

6. A noise insulating structure as claimed in claim 4, wherein said fiber body is formed of single fibers having a diameter ranging from 10 to 30 μm.

7. A noise insulating structure as claimed in claim 1, wherein said third sound absorbing material is formed of a fiber body including at least fibers having a diameter ranging from 10 to 100 μm, and has a surface density ranging from 0.1 to 2.0 kg/m², said third sound absorbing material being formed to occupy a value ranging from 50 to 100% by volume of a space between a skin layer of said floor carpet and a floor panel and to occupy a value ranging from 50 to 100% in area of a whole surface of said floor panel.

8. A noise insulating structure as claimed in claim 7, wherein said fiber body is a fiber mixture of fibers having a diameter ranging from 10 to 100 μm and binder fibers having a diameter ranging from 10 to 100 μm.

9. A noise insulating structure as claimed in claim 7, wherein said fiber body is formed of single fibers having a diameter ranging from 10 to 100 μm.

10. A noise insulating structure as claimed in claim 1, wherein the plurality of sound insulating materials include a fourth sound insulating material disposed to said floor carpet, said fourth sound insulating material being formed in place of a backing layer of said floor carpet and formed of a fiber body including fibers.

11. A noise insulating structure as claimed in claim 10, wherein said fiber body is a fiber mixture of fibers having a diameter ranging from 10 to 100 μm and binder fibers having a diameter ranging from 10 to 100 μm, and has a surface density ranging from 0.1 to 2.0 kg/M².

12. A noise insulating structure as claimed in claim 10, wherein said fiber body is formed of single fibers having a diameter ranging from 10 to 30 μm, and has a surface density ranging from 0.05 to 1.0 kg/M².

* * * * *